May 3, 1938.  F. H. LAMB  2,115,994
HINGED CONNECTION
Filed Sept. 10, 1935
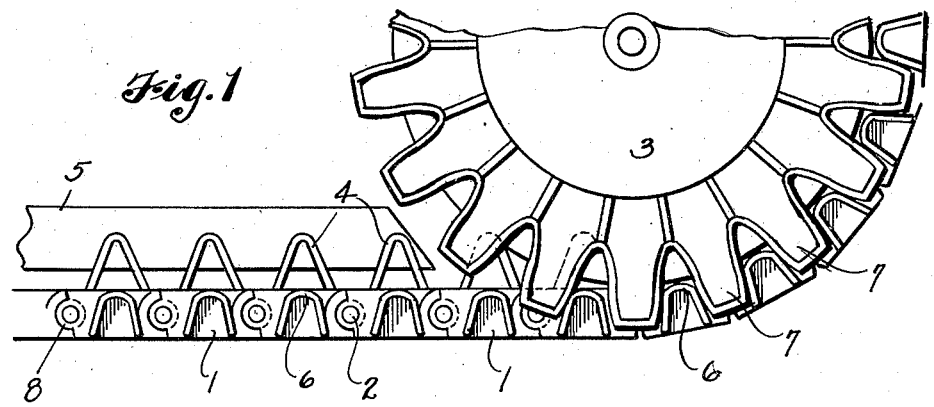
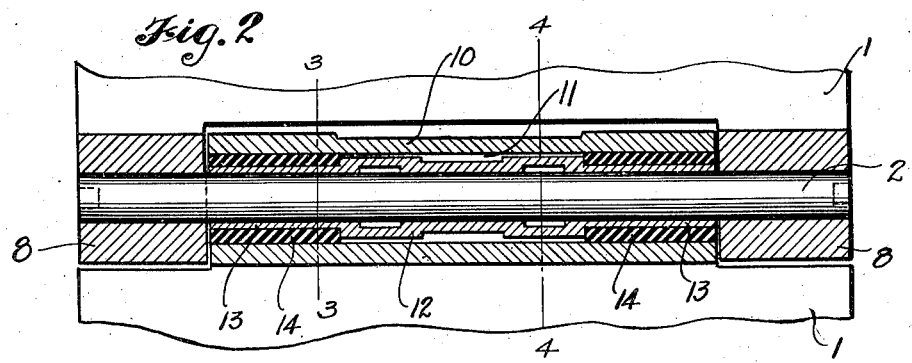
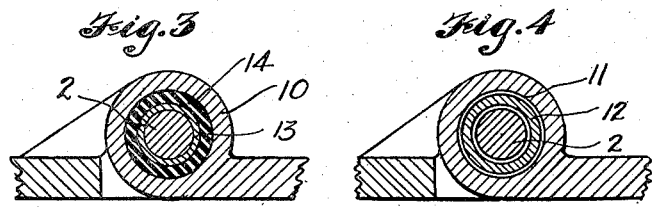
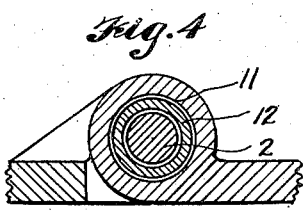
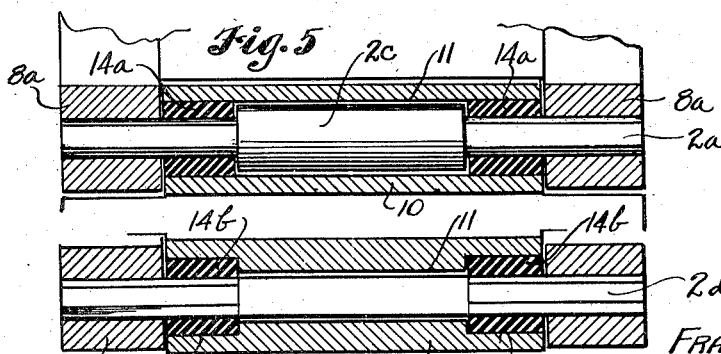
INVENTOR
FRANK H. LAMB
BY
Cook + Robinson
ATTORNEY Patented May 3, 1938

2,115,994

UNITED STATES PATENT OFFICE 2,115,994

HINGED CONNECTION

Frank H. Lamb, Hoquiam, Wash.

Application September 10, 1935, Serial No. 39,930

1 Claim. (Cl. 287—85)

This invention relates to improvements in hinged connections, and more particularly to rubber bushed, hinged connections, especially adapted for joining together the sections of treads or tracks as employed in tractors of the crawler type; it being understood, however, that the invention is not limited in its use to tractors but may be employed successfully in the hinging of parts of various devices or mechanisms, especially those in which angular movement is limited and in which heavy pull is applied and wherein it is desired that the bearing surfaces of the connection be protected from grit and other foreign substances.

In United States Patent No. 1,973,214, issued to me on September 11, 1934, I have shown two sections of a track hingedly joined by a pin which is fixed at its end in one section and is contained rotatably within a bearing chamber of the other section with resilient, shock absorbing bushings fitted about the pin and within the opposite ends of the chamber to seal the latter, yet to permit a hinging action of the connected parts through deformation of the bushings. In this patent the pin is hexagonal in cross section to prevent rotation thereof within the bushings. Also, the bushings, as an aid to assembling them on the pin and proper functioning thereof, are metal lined interiorly and exteriorly.

A feature of the patented construction resides in provision of a bushing, or sleeve, fitted to the hexagonal pin within the chamber and between the rubber bushings, which sleeve will operate to carry any abnormal load placed on the connection and thus relieve the rubber bushings of any possible load that might cause damage thereto.

The principal object of the present invention is to improve upon the device disclosed in the above numbered patent by a novel construction which adds strength and durability thereto and which facilitates assembly and reduces cost of manufacture, and which provides for the use of unlined rubber bushings and a rounded end overload bearing sleeve adapted for installation of the bushings direct on the sleeve instead of the metal lined bushings.

More specifically stated, the present invention resides mainly in the use of the over load sleeve, as a mounting for the rubber bushings and for adding strength to the hinge connection, and which makes possible an easy assembly of the parts, especially where the connected parts are each made in a single casting.

Other objects of the invention reside in the details of construction; in the combination of parts, and in their mode of operation as will hereinafter be fully described.

In accomplishing these and other objects of the invention, I have provided the improved details of construction, the preferred forms of which are illustrated in the accompanying drawing wherein—

Fig. 1 is a view in side elevation of a section of a tractor track or tread, in which the track shoes are hingedly connected in accordance with the present invention.

Fig. 2 is a sectional view, axially of one of the hinged connections, particularly illustrating the over load sleeve and the assembly of the bushings thereon.

Fig. 3 is a cross section on the line 3—3 in Fig. 2.

Fig. 4 is a cross section on the line 4—4 in Fig. 2.

Fig. 5 is a sectional view, similar to that of Fig. 2, illustrating an alternative form of construction suitable for connecting parts where the outer hinge ears are detachable.

Fig. 6 is a sectional view illustrating still another form of construction where the outer ears are detachable.

Referring more in detail to the drawing—

In Fig. 1, I have illustrated a section of the tread, or track, or a tractor of the crawler type. This tread comprises a series of traction shoes 1, pivotally connected by hinge pins 2 to provide an endless track, or belt, adapted to operate about supporting and driving sprocket wheels which may be of that kind designated at 3 in Fig. 1. The several shoes, constituting the track, may be alike in size and construction and suitably designed for strength and traction. As herein shown, the shoes 1 are formed on their inner surfaces and adjacent their opposite ends with the lugs 4 which cooperate with suitable guides which may be wheels or in the form of the rails shown at 5 and extended along the track. Also, the shoes are provided at their ends with projecting flanges 6 to be received between the sprocket teeth 7 of the wheel 3 to effect a positive driving connection between the wheel and the track.

Each shoe, in the construction shown, is provided at opposite ends of one longitudinal edge portion with extended hinge ears 8—8 in which the opposite ends of the hinge pins 2 are mounted. At the longitudinal edge opposite the ears 8—8, the shoe is provided with an elongated, central lug, or hinge ear, 10 of a length to be fitted between the ears 8—8 of an adjacent shoe. The lug 10 of each shoe is cylindrically cored to provide a bearing chamber 11 therein, substantially greater in diameter than the hinge pin and containing the latter coaxially thereof, as shown in Figs. 2, 3 and 4.

Fitted to the pin about that portion within the chamber 11 is the over load sleeve 12. This sleeve is of a suitable metal, it is cylindrical and is coextensive in length with the chamber 11, and its opposite end portions 13—13 are of reduced diameter. Rubber bushings 14—14 are fitted about these reduced end portions and within the ends of the chamber to close the latter against entrance of grit or dirt. The sleeve also has an elongated, central portion of cylindrical form, adapted to carry abnormal loads, or what may be termed "overloads." The over load portion is of slightly lesser diameter than the chamber, and normally does not contact the chamber walls. However, when heavy or abnormal strain is placed upon the connection which deforms the bushings beyond a certain amount, the over load portion of the sleeve is brought into bearing contact with the chamber walls to prevent damage to the bushings.

In assembling the parts of this hinged connection, wherein the two parts that are hinged together are each in a single casting, the sleeve 12 is first disposed within the chamber 11 of one of the sections, the rubber bushings are then pressed into place about the reduced ends of the sleeve and within the ends of the bearing chamber, as shown in Fig. 2; this assembling of the bushing being performed by a machine that is especially designed for the purpose. The rubber bushings used originally have an inside diameter less than that of the sleeve ends to which they are applied and are of larger outside diameter than the diameter of the bearing chamber. Also, they are of lesser length than the length of the reduced end portions of the sleeve. Therefore, when they are pressed into place, this results in their being placed under compression and incidentally elongated to the length of the reduced portions of the sleeve. After the sleeve and bushings have thus been assembled, the two sections are brought into proper relation, as shown in Fig. 2, and the hinge pin 2 is inserted through the sleeve and through the two ears 8—8 which are disposed at opposite ends of the hinge ear 10; it being understood that this pin is pressed into place by a machine of suitable kind, and that it fits tightly within the sleeve and within the ears 8—8 so that there can be no relative rotation of these parts either by reason of tightness of fit, or by a particular shaping. Any relative rotation of the two connected parts is by reason of deformation of the rubber bushings, but under unusual rotative strain, the bushings may slip on the sleeve and thus avoid damage thereto.

In Figs. 5 and 6, I have illustrated alternative constructions that are suitable for use with connected parts wherein the hinge lugs 8—8 are separable from the body of the shoe.

In the construction of Fig. 5, the hinge pin 2a is formed with hexagonal ends and with an enlarged, central portion 2c circular in cross section, designated as the over load portion and corresponding to the enlarged portion of the sleeve 12 in the device of Fig. 2. In this instance the pin is first applied to the bearing chamber 11 and the rubber bushings 14a—14a are pressed into place within the ends of the chamber. Then the hinge lugs 8a—8a are applied to the opposite ends of the pin 2a and are fixed to their corresponding shoe. The hexagonal ends prevent the pin turning in the hinge ears as this is essential to proper functioning.

In the construction of Fig. 6, the hinge pin 2d is inserted through the bearing chamber 11 which has counterbored end portions 11c to receive the bushings 14b—14b. The main portion of the bearing chamber in this case is only slightly greater in diameter than the pin, so that it acts as the over load bearing surface. The ends of the pin, in this instance also, are hexagonal to prevent relative rotation in the ears, and the parts are assembled like those of Fig. 5.

The device of Fig. 2 makes possible the assembly of parts without the use of the metal lined bushings. It also greatly facilitates assembly of bushings within the bearing chambers and adds strength to the connection since the sleeve, in this instance, extends the length of the bearing chamber.

The rubber bushings absorb shock; they seal the bearing chamber and permit of the relative, rotative adjustment of parts essential to the connection. The over load sleeve holds the bushings against inward movement and adds to the life of the assembly.

Having thus described my invention, what I claim as new therein and desire to secure by Letters Patent, is—

In combination, a member provided with spaced apart hinge ears having hinge pin openings therein, another member provided with a hinge lug formed with a cylindrical bearing chamber; said lug being disposed between the said ears, a hinge pin fitted non-rotatably at its ends within the hinge ear openings and extending coaxially of the bearing chamber, a sleeve fitted non-rotatably to the pin within the chamber and formed at its ends with portions of reduced diameter, resilient bushings mounted on said portions of reduced diameter and fitted within the ends of the chamber to seal the latter and permitting hinging action of the two parts through deformation of the bushings, and normally supporting the sleeve free of the chamber walls; said sleeve being adapted to contact the chamber wall incident to over load on the bushings.

FRANK H. LAMB.